(12) United States Patent
Yuan

(10) Patent No.: US 9,467,846 B2
(45) Date of Patent: *Oct. 11, 2016

(54) METHOD, APPARATUS, AND MOBILE PHONE FOR MEASURING AND DISPLAYING INTERNET TRAFFIC OF MOBILE PHONE

(71) Applicant: Huawei Device Co., Ltd., Shenzhen (CN)

(72) Inventor: Zhiquan Yuan, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/323,466

(22) Filed: Jul. 3, 2014

(65) Prior Publication Data

US 2014/0315515 A1  Oct. 23, 2014

Related U.S. Application Data

(63) Continuation of application No. 13/457,214, filed on Apr. 26, 2012, now Pat. No. 8,805,322, which is a continuation of application No. PCT/CN2010/079980, filed on Dec. 20, 2010.

(30) Foreign Application Priority Data

Jan. 12, 2010 (CN) .......................... 2010 1 0000578

(51) Int. Cl.
*H04W 4/26* (2009.01)
*H04W 8/18* (2009.01)
(Continued)

(52) U.S. Cl.
CPC ............ *H04W 8/183* (2013.01); *H04L 12/141* (2013.01); *H04L 12/1464* (2013.01);
(Continued)

(58) Field of Classification Search
CPC .. H04M 15/30; H04M 15/844; H04M 15/84; H04M 15/852; H04M 15/85; H04M 15/857; H04M 15/83; H04M 15/835; H04M 15/774; H04M 15/77; H04M 15/8355; H04M 15/28; H04M 15/8214; H04W 4/24; H04W 4/26; H04W 8/183; H04L 12/1464; H04L 12/141; H04L 12/1435; H04L 12/1439
USPC ......................................... 455/405, 406, 558
See application file for complete search history.

(56) References Cited

U.S. PATENT DOCUMENTS 7,421,287 B2  9/2008 Cho et al.
8,725,110 B2 *  5/2014 Xiong et al. .................. 455/407
(Continued)

FOREIGN PATENT DOCUMENTS

CN  1411314 A  4/2003
CN  1464732 A  12/2003
(Continued)

OTHER PUBLICATIONS

Search Report dated Jul. 25, 2016 for Chinese Application No. 201610135652.5, 16 pages.

*Primary Examiner* — Marcos Torres
(74) *Attorney, Agent, or Firm* — Brinks Gilson & Lione

(57) ABSTRACT

An apparatus for measuring and displaying Internet traffic of a mobile phone, includes a traffic measurement module and a traffic display module. The apparatus also includes a SIM card account creation module configured to create a SIM card account for each of a plurality of SIM cards. The traffic measurement module measures the Internet traffic of each of the SIM card accounts. The traffic display module displays the Internet traffic of each of the SIM card accounts. The Internet traffic of each SIM card on the mobile phone may be measured and displayed.

8 Claims, 3 Drawing Sheets

(51) Int. Cl.
*H04L 12/14* (2006.01)
*H04M 15/28* (2006.01)
*H04M 15/30* (2006.01)
*H04M 15/00* (2006.01)
*H04W 4/24* (2009.01)

(52) U.S. Cl.
CPC ........... *H04M 15/28* (2013.01); *H04M 15/30* (2013.01); *H04M 15/77* (2013.01); *H04M 15/774* (2013.01); *H04M 15/8214* (2013.01); *H04M 15/83* (2013.01); *H04M 15/835* (2013.01); *H04M 15/8355* (2013.01); *H04M 15/84* (2013.01); *H04M 15/844* (2013.01); *H04M 15/85* (2013.01); *H04M 15/852* (2013.01); *H04M 15/857* (2013.01); *H04W 4/24* (2013.01); *H04W 4/26* (2013.01); *H04L 12/1435* (2013.01); *H04L 12/1439* (2013.01)

(56) References Cited

U.S. PATENT DOCUMENTS

| | | |
|---|---|---|
| 2002/0091599 A1 | 7/2002 | Masuda et al. |
| 2005/0096087 A1 | 5/2005 | Kim |
| 2005/0164737 A1 | 7/2005 | Brown |
| 2005/0176465 A1 | 8/2005 | Fornell |
| 2007/0117551 A1 | 5/2007 | Boris et al. |
| 2007/0184858 A1 | 8/2007 | Landschaft et al. |
| 2008/0045179 A1 | 2/2008 | Bekanich et al. |
| 2008/0261603 A1 | 10/2008 | Sever et al. |
| 2010/0048169 A1 | 2/2010 | Yan et al. |
| 2010/0090000 A1 | 4/2010 | Varone et al. |
| 2010/0159874 A1 | 6/2010 | Lewis et al. |
| 2010/0248690 A1 | 9/2010 | Biggs et al. |
| 2012/0158947 A1 | 6/2012 | Hassan et al. |
| 2012/0214439 A1 | 8/2012 | Yuan |
| 2013/0102276 A1* | 4/2013 | Raj et al. ............... 455/406 |
| 2013/0149994 A1* | 6/2013 | Gaddam et al. ........ 455/406 |
| 2013/0210382 A1* | 8/2013 | Korkiakoski et al. ... 455/406 |
| 2014/0323084 A1* | 10/2014 | Menezes et al. ....... 455/406 |

FOREIGN PATENT DOCUMENTS

| | | |
|---|---|---|
| CN | 1885889 A | 12/2006 |
| CN | 101146300 A | 3/2008 |
| CN | 101183950 A | 5/2008 |
| CN | 101459523 A | 6/2009 |
| CN | 101600186 A | 12/2009 |
| CN | 101800792 A | 8/2010 |
| CN | 102045434 A | 5/2011 |
| JP | 2002209030 A | 7/2002 |
| JP | 2005184538 A | 7/2005 |
| JP | 2007221274 A | 8/2007 |
| WO | WO 92/19078 A1 | 10/1992 |

* cited by examiner

METHOD, APPARATUS, AND MOBILE PHONE FOR MEASURING AND DISPLAYING INTERNET TRAFFIC OF MOBILE PHONE

CROSS-REFERENCE TO RELATED APPLICATIONS

This application is a continuation of U.S. patent application Ser. No. 13/457,214, filed on Apr. 26, 2012, which is a continuation of International Application No. PCT/CN2010/079980, filed on Dec. 20, 2010. The International Application claims priority to Chinese Patent Application No. 201010000578.9, filed on Jan. 12, 2010. The afore-mentioned applications are incorporated herein by reference in their entireties.

FIELD OF THE APPLICATION

The present application relates to the field of mobile phone terminal technologies, and in particular, to a method, an apparatus, and a mobile phone for measuring and displaying Internet traffic of a mobile phone.

BACKGROUND OF THE APPLICATION

With the development of 3G technologies, it is increasingly popular to surf the Internet by using a mobile phone. A user hopes to query Internet traffic. For example, the user subscribes to a monthly Internet-surfing package service and may enjoy a total of 1000 MB Internet traffic. A charge for excess of the traffic is high. Therefore, the user hopes to know current Internet traffic to control subsequent Internet traffic so as to save an expense. Currently, the user may query the Internet traffic by logging in to a Web site of an operator such as China Mobile or China Unicom and entering keywords such as a mobile phone number and personal information, or dial a customer service number or send a short message to know the Internet traffic. However, these methods are all cumbersome, and in order to simplify the operational process of the user, some mobile phones integrate a function of querying the Internet traffic. Specifically, an Internet traffic measuring module is disposed in a mobile phone, and the module implements a function of Internet traffic measurement by counting the Internet traffic. The user does not need to perform querying to the operator, and may view a using condition of the Internet traffic simply by using the user's own mobile phone, which is very convenient. However, during the research, the inventor discovers that the Internet traffic measurement function on a mobile phone performs the measurement only for the mobile phone at present, but currently more and more users use two or more SIM cards on one mobile phone, for example, one SIM card is used in office hours, and another SIM card is used at home, or for a dual-mode or multimode mobile phone, multiple SIM cards may be supported simultaneously. In this case, the original Internet traffic measurement based on the mobile phone cannot meet a requirement.

SUMMARY OF THE APPLICATION

The described embodiments provide a method, an apparatus, and a mobile phone for measuring and displaying Internet traffic of a mobile phone so that the Internet traffic of the mobile phone can be measured and displayed based on SIM cards respectively.

For the foregoing purpose, the embodiments adopt the following technical solutions:

An apparatus for measuring and displaying Internet traffic of a mobile phone includes a traffic measuring module, a traffic displaying module, and a SIM card account creating module, where:

the SIM card account creating module is configured to create a SIM card account for each SIM card respectively;

the traffic measuring module is configured to measure Internet traffic of each SIM card account respectively; and the traffic displaying module is configured to display the Internet traffic of each SIM card account respectively.

A mobile phone for measuring and displaying Internet traffic according to SIM cards includes a traffic measuring module, a traffic displaying module, and a SIM card account creating module, where:

the SIM card account creating module is configured to create a SIM card account for each SIM card respectively;

the traffic measuring module is configured to measure Internet traffic of each SIM card account respectively; and the traffic displaying module is configured to display the Internet traffic of each SIM card account respectively.

A method for measuring and displaying Internet traffic of a mobile phone includes:

creating a SIM card account for each SIM card respectively;

when there is an Internet data stream, determining a SIM card account corresponding to the data stream, and writing Internet traffic of the data stream into the corresponding SIM card account; and displaying the Internet traffic according to the SIM card account.

Therefore, in the embodiments, the Internet traffic of each SIM card may be measured and displayed respectively, thereby meeting a requirement of a user.

DETAILED DESCRIPTION OF THE EMBODIMENTS

In view of a situation where one mobile phone has multiple SIM cards, in the embodiments, Internet traffic of each SIM card is measured respectively to meet a requirement of a user for performing traffic measurement for each SIM card, thereby better meeting the requirement of the user.

Figure 1:
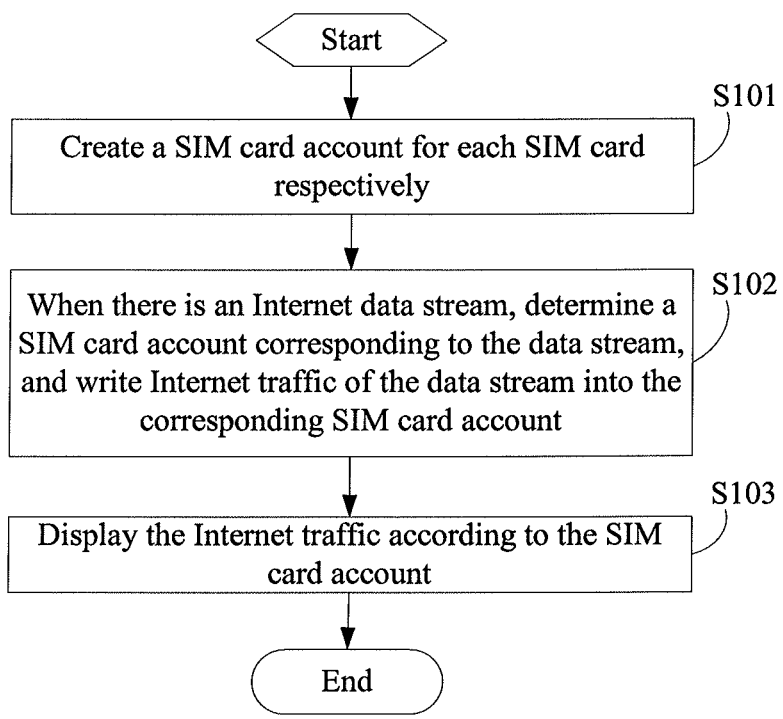
FIG. 1 is a flowchart of a method for measuring and displaying Internet traffic of a mobile phone according to an embodiment.

FIG. 1 is a flowchart of a method for measuring and displaying Internet traffic of a mobile phone according to an embodiment. The method includes the following steps:

S101: Create a SIM card account for each SIM card respectively.

S102: When there is an Internet data stream, determine a SIM card account corresponding to the data stream, and write Internet traffic of the data stream into the corresponding SIM card account.

S103: Display the Internet traffic according to the SIM card account.

Where, S101 includes:

S101a: Extract from each SIM card a unique identity of the SIM card.

S101b: Create a SIM card account corresponding to the unique identity of the SIM card.

The embodiments are described in detail below from each of the stages: creating a SIM card account, measuring Internet traffic, and displaying the Internet traffic.

Figure 2:
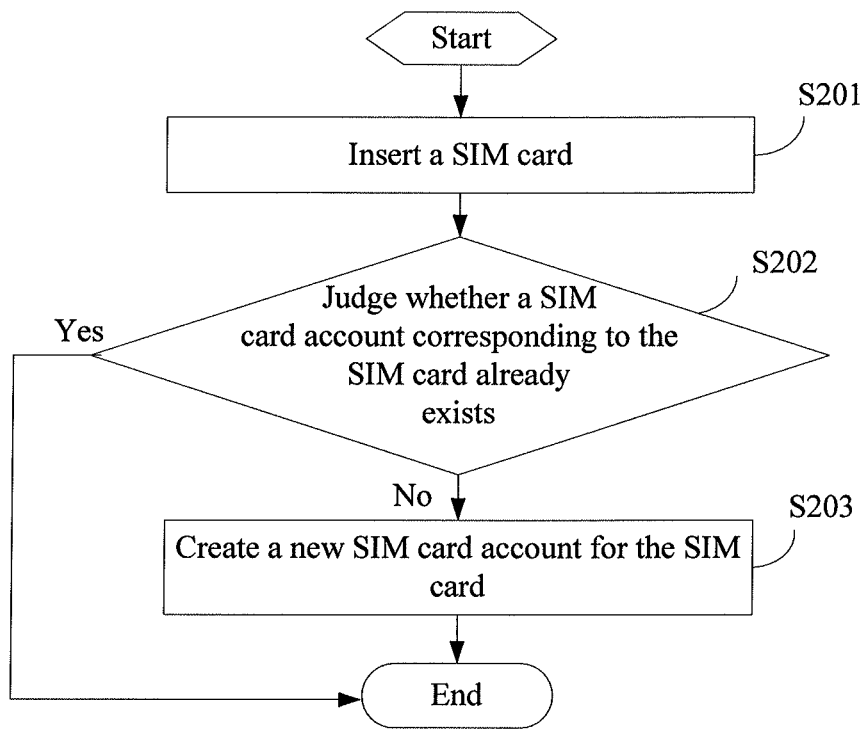
FIG. 2 is a flowchart of creating a SIM card account according to another embodiment.

FIG. 2 is a flowchart of creating a SIM card account according to another embodiment, that illustrates the following operations:

S201: Insert a SIM card.

S202: Judge whether a SIM card account corresponding to the SIM card already exists or not. If the SIM card account corresponding to the SIM card already exists, perform S203; or else, the process ends.

S203: Create a new SIM card account for the SIM card. Then, the process ends.

After a mobile phone is powered on, a background program first judges whether there is an account or not according to the SIM card and an Internet data stream on the mobile phone. If there is an account, the process of creating a SIM card account is skipped. Otherwise, a new SIM card account is created in a database.

Figure 3:
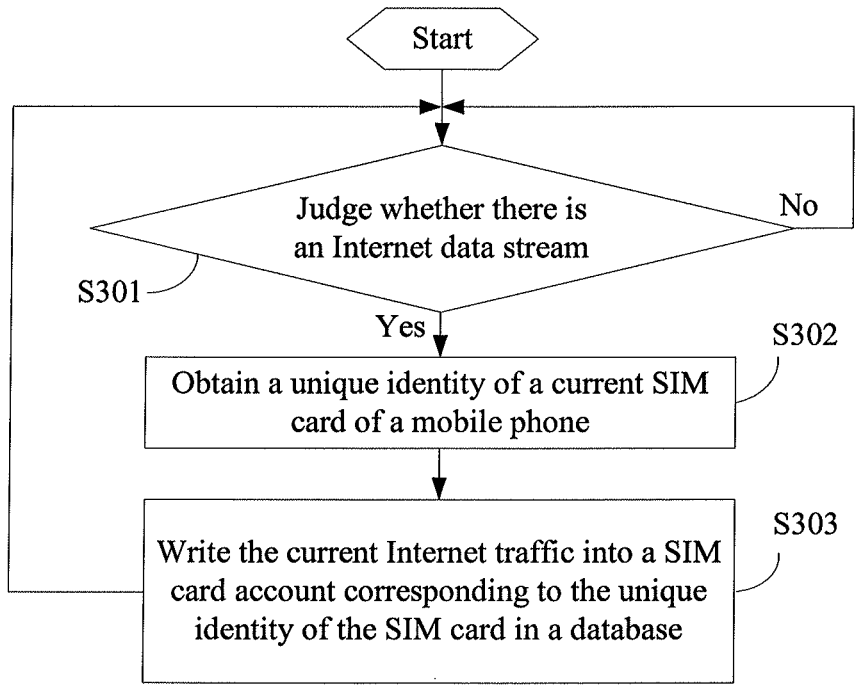
FIG. 3 is a flowchart of measuring traffic according to another embodiment.

FIG. 3 is a flowchart for measuring traffic according to another embodiment, including:

S301: Judge whether there is an Internet data stream or not. If there is an Internet data stream, perform S302; or else, keep performing S301.

S302: Obtain a unique identity of a current SIM card of a mobile phone (such as a SIM card number or part of fields of the SIM card number or a coding result of the SIM card number).

S303: Write current Internet traffic into a SIM card account corresponding to the unique identity of the SIM card in a database, and then continue to perform S301.

A background application keeps monitoring whether there is an Internet data stream or not. If there is no Internet data stream, the background application waits. If there is an Internet data stream, the current SIM card account is first obtained and then the Internet traffic is written into the corresponding SIM card account.

Figure 4:
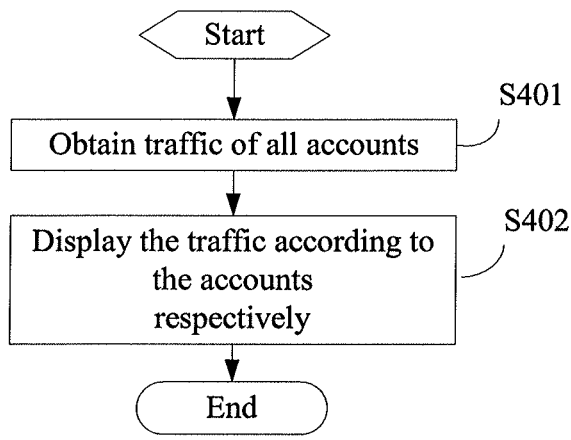
FIG. 4 is a flowchart of displaying traffic according to another embodiment.

FIG. 4 is a flowchart of displaying traffic according to another embodiment, including:

S401: Obtain traffic of all accounts.

S402: Display the traffic according to accounts respectively.

An embodiment further provides an apparatus for measuring and displaying Internet traffic of a mobile phone. The apparatus may be implemented through software, hardware, or a combination of software and hardware. Specifically, the apparatus is disposed in a mobile phone for a user to query the Internet traffic of each SIM card.

Figure 5:
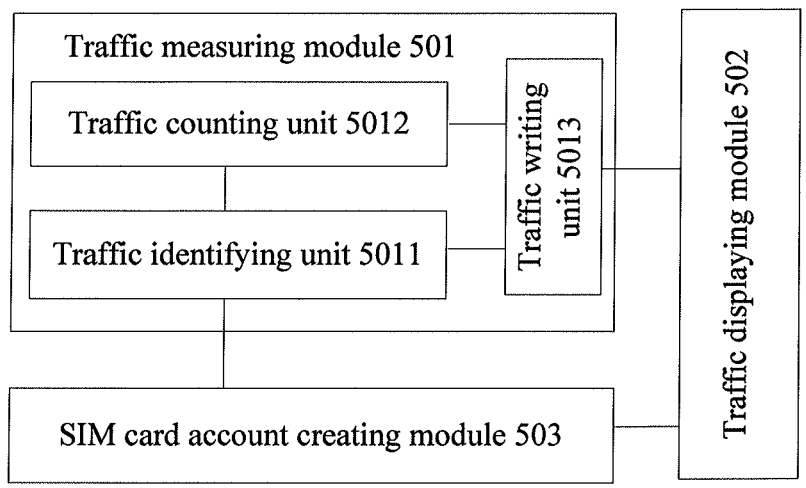
FIG. 5 is a schematic diagram of an apparatus for measuring and displaying Internet traffic of a mobile phone according to an embodiment.

FIG. 5 shows an apparatus for measuring and displaying Internet traffic of a mobile phone according to an embodiment. The apparatus includes a traffic measuring module 501, a traffic displaying module 502, and a SIM card account creating module 503, where:

the SIM card account creating module 503 is configured to create a SIM card account for each SIM card respectively; and the traffic measuring module 501 measures the Internet traffic of each SIM card account respectively, and the traffic displaying module 502 displays the Internet traffic of each SIM card account respectively.

The traffic measuring module 501 includes:

a traffic identifying unit 5011, configured to identify a SIM card account corresponding to the current Internet traffic;

a traffic counting unit 5012, configured to count the traffic; and a traffic writing unit 5013, configured to write the Internet traffic counted by the traffic counting unit 5012 into the corresponding SIM card account.

The SIM card account creating module 503 includes: an extracting submodule, configured to extract from each SIM card a unique identity of the SIM card; and a creating submodule, configured to create a SIM card account corresponding to the unique identity of the SIM card.

The Internet traffic displayed by the traffic-displaying module 502 is displayed in MB or by Internet-surfing time.

It should be noted that there are mature codes or hardware in an existing scheme for implementing the traffic measuring module and the traffic-displaying module. Therefore, the prior art may be applied directly in this embodiment.

In addition, an embodiment further provides a mobile phone for measuring and displaying Internet traffic according to SIM cards, and through the mobile phone, a user may query the Internet traffic of each SIM card.

The mobile phone includes at least the following modules:

a SIM card account creating module, configured to create a SIM card account for each SIM card respectively;

a traffic measuring module, configured to measure Internet traffic of each SIM card account respectively; and a traffic displaying module, configured to display the Internet traffic of each SIM card account respectively.

The traffic measuring module includes:

a traffic identifying unit, configured to identify a SIM card account corresponding to the current Internet traffic;

a traffic counting unit, configured to count the traffic; and a traffic writing unit, configured to write the Internet traffic measured by the traffic counting unit into the corresponding SIM card account.

The SIM card account creating module includes: an extracting submodule, configured to extract from each SIM card a unique identity of the SIM card; and a creating submodule, configured to create a SIM card account corresponding to the unique identity of the SIM card.

The Internet traffic displayed by the traffic displaying module is displayed in MB or by Internet-surfing time.

Therefore, in the embodiments, the Internet traffic of each SIM card can be measured and displayed respectively, thereby meeting the requirement of the user, where at the time of displaying the traffic, duration may be displayed to the user, for example, Internet-surfing time is displayed, or the amount of used data resources is displayed to the user, for example, that how many megabytes (M) of data resources have been used is displayed.

Using an actual example for description, it is assumed that a user uses two SIM cards, that is, SIM 1 and SIM 2, on a mobile phone. Monthly Internet-surfing package services subscribed by the two cards are different, that is, the service subscribed by SIM 1 is 100 minutes of free Internet-surfing time and a high charge for excess of 100 minutes, while the service subscribed by SIM 2 is 1000 MB free traffic and a high charge for excess of 1000 MB Internet traffic. According to the embodiments, the Internet traffic may be measured and displayed for SIM 1 and SIM 2 respectively so that the user can view a current Internet-surfing condition of each SIM card in an intuitive manner. For example, the user knows through a query that the Internet-surfing time that has been used currently by SIM 1 in a current month is 90 minutes, and that the traffic that has been currently used by SIM 2 in the current month is 300 MB. Therefore, the user may properly reduce the use of SIM 1 for surfing the Internet and properly increase the use of SIM 2 for surfing the Internet during the subsequent time of the current month, so as to achieve an object of saving an expense.

Those of ordinary skill in the art may understand that the processes of the methods of the foregoing embodiments may be completed by relevant hardware instructed by a program. The program may be stored in a readable storage medium. When the program is executed, the corresponding steps in the foregoing methods are performed. The storage medium may be an ROM/RAM, a magnetic disk, a CD-ROM, and so on.

The foregoing describes only exemplary embodiments. It should be understood that those of ordinary skill in the art might modify or improve upon the embodiments. Any such modifications and improvements shall be deemed to fall within the protection scope of the claims.

What is claimed is:

1. A method for measuring and displaying data traffic of a mobile phone, the mobile phone supporting a plurality of subscriber identity module (SIM) cards, the method comprising:
    monitoring, by the mobile phone, whether the mobile phone has an ongoing data stream;
    if the mobile phone has an ongoing data stream, measuring, by the mobile phone, the data traffic of the ongoing data stream;
    if the ongoing data stream corresponds to a first SIM card of the plurality of SIM card, storing, by the mobile phone, the measured data traffic of the ongoing data stream into a first SIM card account associated with the first SIM card;
    if the ongoing data stream corresponds to a second SIM card of the plurality of SIM cards, storing, by the mobile phone, the measured data traffic of the ongoing data stream into a second SIM card account created associated with the second SIM card; and
    displaying, by the mobile phone, data traffic of the first SIM card account and data traffic of the second SIM card account respectively.

2. The method according to claim 1, wherein before monitoring, by the mobile phone, whether the mobile phone has an ongoing data stream, the method comprises:
    extracting, by the mobile phone, a unique identity of each SIM card of the plurality of SIM cards;
    creating, by the mobile phone, the first SIM card account corresponding to the unique identity of the first SIM card; and
    creating, by the mobile phone, the second SIM card account corresponding to the unique identity of the second SIM card.

3. The method according to claim 1, wherein the data traffic comprises a data resource amount.

4. The method according to claim 1, wherein the data traffic comprises data surfing duration.

5. A mobile phone supporting a plurality of subscriber identity module (SIM) cards, comprising:
    a transceiver, configured to receive and send data stream;
    a processor, configured to:
        monitor whether the mobile phone has an ongoing data stream;
        if the transceiver receives an ongoing data stream, measure the data traffic of the ongoing data stream;
        if the ongoing data stream corresponds to a first SIM card of the plurality of SIM cards, store the measured data traffic of the ongoing data stream into a first SIM card account created for the first SIM card; and
        if the ongoing data stream corresponds to a second SIM card of the plurality of SIM cards, store the measured data traffic of the ongoing data stream into a second SIM card account created for the second SIM card;
    wherein the mobile phone further comprises a display configured to display data traffic of the first SIM card account and data traffic of the second SIM card account respectively.

6. The mobile phone according to claim 5, wherein the processor is further configured to: extract a unique identity of each SIM card of the plurality of SIM cards, create the first SIM card account corresponding to the unique identity of the first SIM card, and create the second SIM card account corresponding to the unique identity of the second SIM card.

7. The mobile phone according to claim 5, wherein the data traffic comprises a data resource amount.

8. The mobile phone according to claim 5, wherein the data traffic comprises data surfing duration.

* * * * *